(12) United States Patent
Shin et al.

(10) Patent No.: US 9,619,073 B2
(45) Date of Patent: Apr. 11, 2017

(54) TOUCH SCREEN DRIVER INCLUDING OUT-OF-PHASE DRIVING SIGNALS SIMULTANEOUSLY SUPPLIED TO ADJACENT TX LINES FOR REDUCING NOISE FROM A DISPLAY PANEL, AND METHOD FOR DRIVING THE SAME

(71) Applicant: LG Display Co., Ltd., Seoul (KR)

(72) Inventors: Myungho Shin, Gyeonggi-do (KR); Jiho Cho, Gyeonggi-do (KR); Jungtae Bae, Seoul (KR)

(73) Assignee: LG Display Co., Ltd., Seoul (KR)

( * ) Notice: Subject to any disclaimer, the term of this patent is extended or adjusted under 35 U.S.C. 154(b) by 525 days.

(21) Appl. No.: 13/626,287

(22) Filed: Sep. 25, 2012

(65) Prior Publication Data

US 2013/0076675 A1     Mar. 28, 2013

(30) Foreign Application Priority Data

Sep. 27, 2011  (KR) .......................... 10-2011-0097283
Nov. 25, 2011  (KR) .......................... 10-2011-0124558

(51) Int. Cl.
  *G06F 3/038*  (2013.01)
  *G06F 3/041*  (2006.01)
  *G06F 3/044*  (2006.01)

(52) U.S. Cl.
  CPC ............ *G06F 3/0416* (2013.01); *G06F 3/044* (2013.01); *G06F 3/0412* (2013.01)

(58) Field of Classification Search
  CPC .................................................... G06F 3/0416
  See application file for complete search history.

(56) References Cited

U.S. PATENT DOCUMENTS

| 5,920,309 A * | 7/1999 | Bisset ..................... G06F 3/044 |
| | | 178/18.06 |
| 2009/0127005 A1* | 5/2009 | Zachut ..................... G06F 3/044 |
| | | 178/18.03 |
| 2010/0066692 A1 | 3/2010 | Noguchi et al. |
| 2010/0085322 A1* | 4/2010 | Mamba et al. ............... 345/173 |

(Continued)

FOREIGN PATENT DOCUMENTS

| JP | 2010072743 A | 4/2010 |
| KR | 20110065768 A | 6/2011 |

OTHER PUBLICATIONS

Office Action dated May 12, 2014 from the Korean Patent Office in Korean counterpart application No. 10-2011-0097283.

*Primary Examiner* — Joseph Haley
*Assistant Examiner* — Karin Kiyabu
(74) *Attorney, Agent, or Firm* — Morgan, Lewis & Bockius LLP

(57) ABSTRACT

A touch screen driver and method for driving the same are disclosed. The touch screen driver includes a Tx driving circuit which sequentially supplies a pair of out-of-phase composed of a first driving signal and a second driving signal which has a phase difference of 180° with respect to the first driving signal and the second driving signal driving signals to Tx lines, wherein the first signal and the second signal are simultaneously supplied to the adjacent Tx lines, respectively; and an Rx driving circuit which samples a charge of the touch sensor received through the Rx lines coupled with the Tx lines and converts the sampled charge into digital data.

15 Claims, 17 Drawing Sheets

(56) References Cited

U.S. PATENT DOCUMENTS

| | | | |
|---|---|---|---|
| 2010/0321315 A1* | 12/2010 | Oda | G06F 3/044 |
| | | | 345/173 |
| 2010/0321334 A1* | 12/2010 | Oda | G06F 3/044 |
| | | | 345/174 |
| 2011/0080353 A1* | 4/2011 | Kang | G06F 3/044 |
| | | | 345/173 |
| 2011/0157095 A1* | 6/2011 | Drumm | 345/175 |
| 2011/0227863 A1* | 9/2011 | Cheng et al. | 345/174 |
| 2012/0056841 A1* | 3/2012 | Krenik | G06F 3/044 |
| | | | 345/174 |
| 2012/0194469 A1* | 8/2012 | Wang | G06F 3/044 |
| | | | 345/174 |
| 2014/0225840 A1* | 8/2014 | Jamshidi-Roudbari | G06F 3/044 |
| | | | 345/173 |
| 2014/0354592 A1* | 12/2014 | Kang | G06F 3/044 |
| | | | 345/174 |
| 2015/0002460 A1* | 1/2015 | Lee | G06F 3/0416 |
| | | | 345/174 |
| 2015/0035794 A1* | 2/2015 | Zhitomirskiy | G06F 3/044 |
| | | | 345/174 |
| 2015/0062080 A1* | 3/2015 | Kang | G06F 3/0416 |
| | | | 345/174 |

* cited by examiner

FIG. 19

|  | R1 | R2 | R3 | ... | R41 | R42 | R43 |
|---|---|---|---|---|---|---|---|
| Dummy Data = All Rx = 0 → | 0 | 0 | 0 | ... | 0 | 0 | 0 |
| Change amount of Rx(p) with respect to T1 and T2 → | 2000 | 2000 | 2000 | ... | 2000 | 2000 | 2000 |
| Change amount of Rx(p) with respect to T2 and T3 → | 2000 | 2000 | 2000 | ... | 2000 | 2000 | 2000 |
| RData | ... | | | | | | |
| | 2000 | 2000 | 2000 | ... | 2000 | 2000 | 2000 |
| Change amount of Rx(p) with respect to T24 and T25 → | 2000 | 2000 | 2000 | ... | 2000 | 2000 | 2000 |
| Change amount of Rx(p) with respect to T25 and T26 → | 2000 | 2000 | 2000 | ... | 2000 | 2000 | 2000 |
| Change amount of Rx(p) with respect to T26 and T27 → | 2000 | 2000 | 2000 | ... | 2000 | 2000 | 2000 |

FIG. 20

|  | R1 | R2 | R3 |  | R41 | R42 | R43 |
|---|---|---|---|---|---|---|---|
| Dummy Data = All Rx = 0 → | 0 | 0 | 0 | ... | 0 | 0 | 0 |
| Change amount of Rx(p) with respect to T1 and T2 → | 2000 | 2000 | (1000) ~IN1 | ... | 2000 | 2000 | 2000 |
| Change amount of Rx(p) with respect to T2 and T3 → | 2000 | 2000 | 2000 | ... | 2000 | 2000 | 2000 |
| NData ~ | | | | ... | | | |
|  | 2000 | 2000 | 2000 | ... | 2000 | 2000 | 2000 |
| Change amount of Rx(p) with respect to T24 and T25 → | 2000 | 2000 | (3000) ~IN2 | ... | 2000 | 2000 | 2000 |
| Change amount of Rx(p) with respect to T25 and T26 → | 2000 | 2000 | 2000 | ... | 2000 | 2000 | 2000 |
| Change amount of Rx(p) with respect to T26 and T27 → | 2000 | 2000 | (1000) ~IN3 | ... | 2000 | 2000 | 2000 |

FIG. 21

|  | R1 | R2 | R3 |  | R41 | R42 | R43 |
|---|---|---|---|---|---|---|---|
| Dummy Data = All Rx = 0 → | 0 | 0 | 0 | ←N1 ··· | 0 | 0 | 0 |
| Change amount of Rx(p) with respect to T1 and T2 → | 0 | 0 | −1000 | ←N2 ··· | 0 | 0 | 0 |
| Change amount of Rx(p) with respect to T2 and T3 → | 0 | 0 | 0 | ←N3 ··· | 0 | 0 | 0 |
| CData= NData−RData | ··· | | | | | | |
| | 0 | 0 | 0 | ←N24 ··· | 0 | 0 | 0 |
| Change amount of Rx(p) with respect to T24 and T25 → | 0 | 0 | 1000 | ←N25 ··· | 0 | 0 | 0 |
| Change amount of Rx(p) with respect to T25 and T26 → | 0 | 0 | 0 | ←N26 ··· | 0 | 0 | 0 |
| Change amount of Rx(p) with respect to T26 and T27 → | 0 | 0 | −1000 | ←N27 ··· | 0 | 0 | 0 |

FIG. 22

| | R1 | R2 | R3 | | | R41 | R42 | R43 |
|---|---|---|---|---|---|---|---|---|
| | 0 | 0 | 0 | ←l1 ··· | | 0 | 0 | 0 |
| | 0 | 0 | -1000 | ←l2 ··· | | 0 | 0 | 0 |
| | 0 | 0 | -1000 | ←l3 ··· | | 0 | 0 | 0 |
| | | | | ··· | | | | |
| | 0 | 0 | -1000 | ←l24 ··· | | 0 | 0 | 0 |
| | 0 | 0 | 0 | ←l25 ··· | | 0 | 0 | 0 |
| | 0 | 0 | 0 | ←l26 ··· | | 0 | 0 | 0 |
| | 0 | 0 | -1000 | ←l27 ··· | | 0 | 0 | 0 |

Integrated CData

↓ Y-axis integration direction

FIG. 23

|  | R1 | R2 | R3 | ... | R41 | R42 | R43 |
|---|---|---|---|---|---|---|---|
| Change amount of Rx(p) with respect to T1 → | 0 | 0 | 1000 | ... | 0 | 0 | 0 |
| Change amount of Rx(p) with respect to T2 → | 0 | 0 | 0 | ... | 0 | 0 | 0 |
|  | 0 | 0 | 0 | ... | 0 | 0 | 0 |
| Y-axis compensation data | | | | ... | | | |
|  | 0 | 0 | 0 | ... | 0 | 0 | 0 |
| Change amount of Rx(p) with respect to T25 → | 0 | 0 | 1000 | ... | 0 | 0 | 0 |
| Change amount of Rx(p) with respect to T26 → | 0 | 0 | 1000 | ... | 0 | 0 | 0 |
| Change amount of Rx(p) with respect to T27 → | 0 | 0 | 0 | ... | 0 | 0 | 0 |

TOUCH SCREEN DRIVER INCLUDING OUT-OF-PHASE DRIVING SIGNALS SIMULTANEOUSLY SUPPLIED TO ADJACENT TX LINES FOR REDUCING NOISE FROM A DISPLAY PANEL, AND METHOD FOR DRIVING THE SAME

This application claims the benefit of Korean Patent Application No. 10-2011-0097283 filed on Sep. 27, 2011, and Korean Patent Application No. 10-2011-0124558 filed on Nov. 25, 2011, the entire contents of which is incorporated herein by reference for all purposes as if fully set forth herein.

BACKGROUND OF THE INVENTION

Field of the Invention

The invention relate to a touch screen driver and a method for driving the same.

Discussion of the Related Art

User interface (UI) is configured so that a user can easily and comfortably control various electronic devices as he or she desires. Examples of the user interface include a keypad, a keyboard, a mouse, an on-screen display (OSD), and a remote controller having an infrared communication function or a radio frequency (RF) communication function. User interface technologies have continuously expanded to increase user's sensibility and handling convenience. A touch UI, a voice recognition UI, a 3D UI, etc. have been recently developed as the user interface.

The touch UI has been necessarily used in portable information appliances and has been expanded to the use of home appliances. There is a mutual capacitance touch screen as an example of a touch screen for implementing the touch UI. The mutual capacitance touch screen can perform the proximity sensing as well as the touch sensing and also can recognize respective touch locations of a multi-touch (or proximity touch) operation.

The mutual capacitance touch screen includes Tx lines, Rx lines, and touch sensors formed between the Tx lines and the Rx lines. Each of the touch sensors has a mutual capacitance. Driving signals are applied to the Tx lines, and charges of the touch sensors are sensed through the Rx lines every time the driving signals are applied. A touch screen driver senses changes in the charges of the touch sensors before and after a touch (or proximity) operation, thereby deciding whether or not the touch (or proximity) operation of a conductive material is performed and deciding a location of the touch (or proximity) operation.

The touch screen may be attached on a display panel of a display device or embedded in the display panel. The touch screen is easily affected by driving signals of the display panel because of an electrical coupling between the touch screen and the display panel. A noise, which affects the touch screen due to the driving signals of the display panel, causes the error recognition of the touch screen or a reduction in the touch sensitivity.

SUMMARY OF THE INVENTION

Embodiments of the invention provide a touch screen driver and a method for driving the same capable of reducing an influence of a noise from a display panel.

In one aspect, there is a touch screen driver including a touch screen including Tx lines, Rx lines crossing the Tx lines, and touch sensors formed between the Tx lines and the Rx lines; a Tx driving circuit configured to sequentially supply a pair of out-of-phase driving signals composed of a first driving signal and a second driving signal which has a phase difference of 180° with respect to the first driving signal and the second driving signal to the Tx lines, wherein the first driving signal and the second driving signal are simultaneously supplied to the adjacent two Tx lines, respectively; and an Rx driving circuit configured to sample a charge of the touch sensor received through the Rx lines coupled with the Tx lines and convert the sampled charge into digital data.

The Rx driving circuit outputs initial digital data obtained as an initial scanning result of the touch screen and outputs digital data obtained as a scanning result of the touch screen as normal data when a touch input of the touch screen is generated.

In another aspect, there is a method for driving a touch screen driver including a touch screen including Tx lines, Rx lines crossing the Tx lines, and touch sensors formed between the Tx lines and the Rx lines, the method including sequentially supplying a pair of out-of-phase driving signals composed of a first driving signal and a second driving signal which has a phase difference of 180° with respect to the first driving signal and the second driving signal to the Tx lines, wherein the first driving signal and the second driving signal are simultaneously supplying out-of-phase driving signals to the adjacent two Tx lines, respectively, and sampling a charge of the touch sensor received through the Rx lines coupled with the Tx lines and converting the sampled charge into digital data.

The converting of the sampled charge into the digital data includes generating initial digital data obtained as an initial scanning result of the touch screen, and generating digital data obtained as a scanning result of the touch screen as normal data when a touch input of the touch screen is generated.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 10 is an equivalent circuit diagram of a sampling circuit when switches S11 and S12 shown in FIGS. 9A and 9B are turned on;

FIG. 11 is an equivalent circuit diagram of a sampling circuit when switches S21 and S22 shown in FIGS. 9A and 9B are turned on;

FIG. 19 illustrates an example of reference data;

FIG. 20 illustrates an example of normal data;

FIG. 21 illustrates an example of first compensation data;

FIG. 22 illustrates integration results of first compensation data; and

FIG. 23 illustrates an example of final touch raw data obtained by adding a compensation value to integration results.

DETAILED DESCRIPTION OF THE EMBODIMENTS

Figure 1:
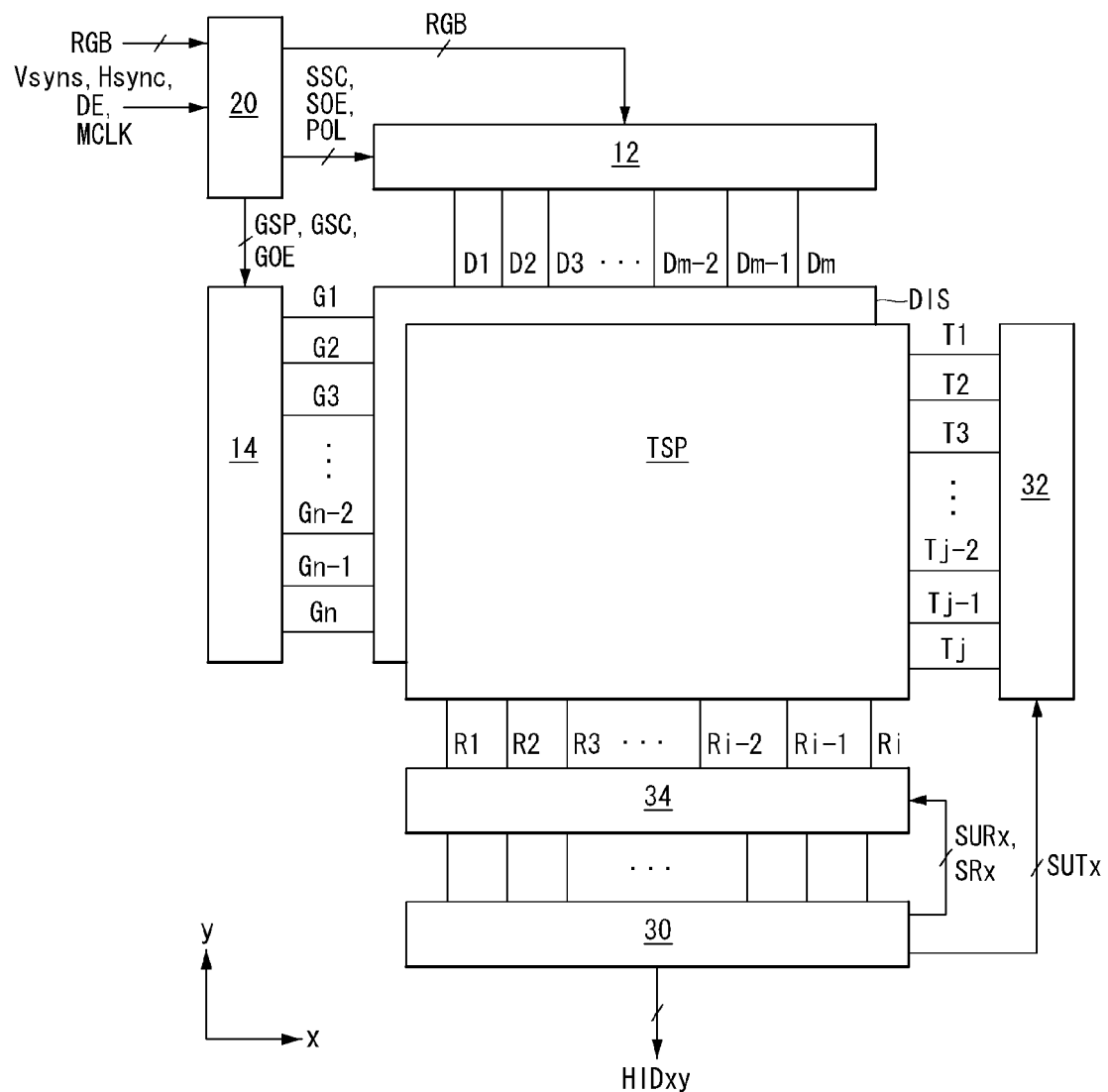
FIG. 1 is a block diagram of a display device according to an example embodiment of the invention.

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

As shown in FIGS. 1 to 5, a display device according to an example embodiment of the invention includes a display panel DIS, a display driving circuit, a touch screen TSP, a touch screen driving circuit, and the like.

The display device according to the embodiment of the invention may be implemented as a flat panel display, such as a liquid crystal display (LCD), a field emission display (FED), a plasma display panel (PDP), an organic light emitting diode (OLED) display, and an electrophoresis display (EPD). In the following description, the liquid crystal display is used as an example of the flat panel display. Other flat panel displays may be used.

The display panel DIS includes a lower glass substrate GLS2, an upper glass substrate GLS1, and a liquid crystal layer formed between the lower glass substrate GLS2 and the upper glass substrate GLS1. The lower glass substrate GLS2 of the display panel DIS includes a plurality of data lines D1 to Dm, where m is a natural number, a plurality of gate lines (or scan lines) G1 to Gn crossing the data lines D1 to Dm, where n is a natural number, a plurality of thin film transistors (TFTs) formed at crossings of the data lines D1 to Dm and the gate lines G1 to Gn, a plurality of pixel electrodes for charging liquid crystal cells to a data voltage, a plurality of storage capacitors, each of which is connected to the pixel electrode and holds a voltage of the liquid crystal cell, etc. The display panel DIS may use any known display panel structure.

Pixels of the display panel DIS are respectively formed in pixel areas defined by the data lines D1 to Dm and the gate lines G1 to Gn to form a matrix structure. The liquid crystal cell of each pixel is driven by an electric field generated depending on a voltage difference between the data voltage supplied to the pixel electrode and a common voltage supplied to a common electrode, thereby adjusting an amount of light transmitted by the liquid crystal cell. The TFTs are turned on in response to a gate pulse (or a scan pulse) from the gate lines G1 to Gn, thereby supplying the voltage from the data lines D1 to Dm to the pixel electrodes of the liquid crystal cells.

The upper glass substrate GLS1 of the display panel DIS may include black matrixes, color filters, etc. The lower glass substrate GLS2 of the display panel DIS may be configured in a color filter on TFT (COT) structure. In this instance, the black matrixes and the color filters may be formed on the lower glass substrate GLS2 of the display panel DIS.

Polarizing plates POL1 and POL2 are respectively attached to the upper and lower glass substrates GLS1 and GLS2 of the display panel DIS. Alignment layers for setting a pre-tilt angle of liquid crystals are respectively formed on the inner surfaces contacting the liquid crystals in the upper and lower glass substrates GLS1 and GLS2 of the display panel DIS. A column spacer may be formed between the upper and lower glass substrates GLS1 and GLS2 of the display panel DIS to keep cell gaps of the liquid crystal cells constant.

The display panel DIS may be implemented in any known mode including a twisted nematic (TN) mode, a vertical alignment (VA) mode, an in-plane switching (IPS) mode, and a fringe field switching (FFS) mode.

A backlight unit (not shown) may be disposed in the rear of the display panel DIS. The backlight unit may be configured as one of an edge type backlight unit and a direct type backlight unit to provide light to the display panel DIS.

The display driving circuit includes a data driving circuit 12, a scan driving circuit 14, a timing controller 20, etc. The display driving circuit writes a video data voltage of an input image to the pixels of the display panel DIS.

The data driving circuit 12 converts digital video data RGB received from the timing controller 20 into positive and negative analog gamma compensation voltages and outputs the data voltages. The data driving circuit 12 supplies the data voltages to the data lines D1 to Dm. The scan driving circuit 14 sequentially supplies the gate pulse (or the scan pulse) synchronized with the data voltage to the gate lines G1 to Gn and selects lines of the display panel DIS to which the data voltages are written.

The timing controller 20 receives timing signals, such as a vertical sync signal Vsync, a horizontal sync signal Hsync, a data enable DE, and a main clock MCLK, from an external host system. The timing controller 20 generates a data timing control signal and a scan timing control signal for respectively controlling operation timings of the data driving circuit 12 and the scan driving circuit 14 using the timing signals. The data timing control signal includes a source sampling clock SSC, a source output enable SOE, a polarity control signal POL, etc. The scan timing control signal includes a gate start pulse GSP, a gate shift clock GSC, a gate output enable GOE, etc.

Figure 3:
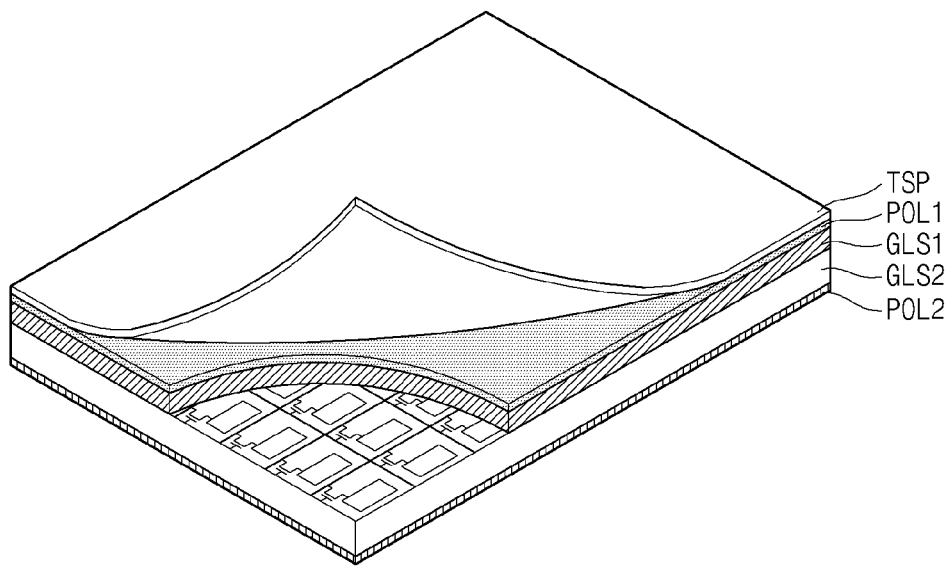
FIGS. 3 to 5 illustrate various configurations of a touch screen and a display panel according to an example embodiment of the invention.
Figure 4:
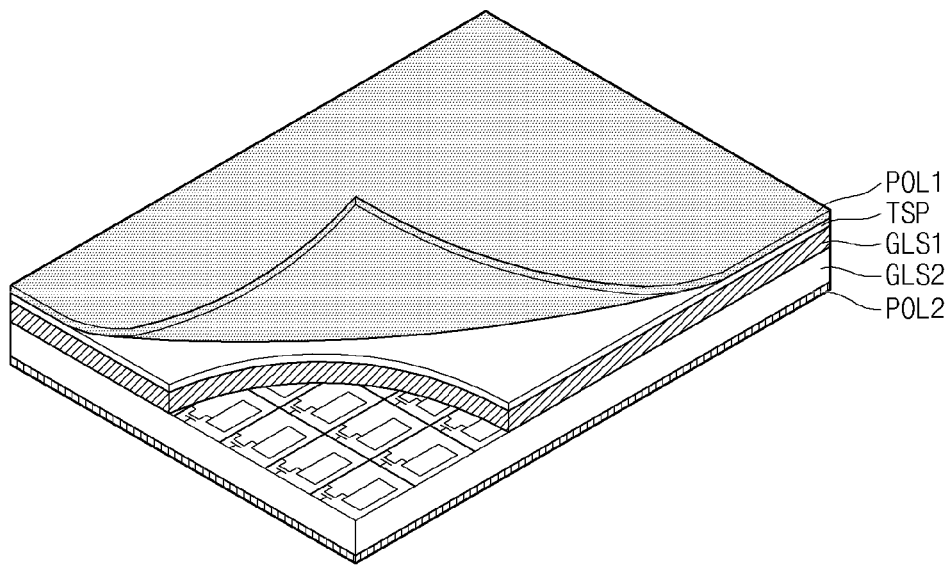
Figure 5:
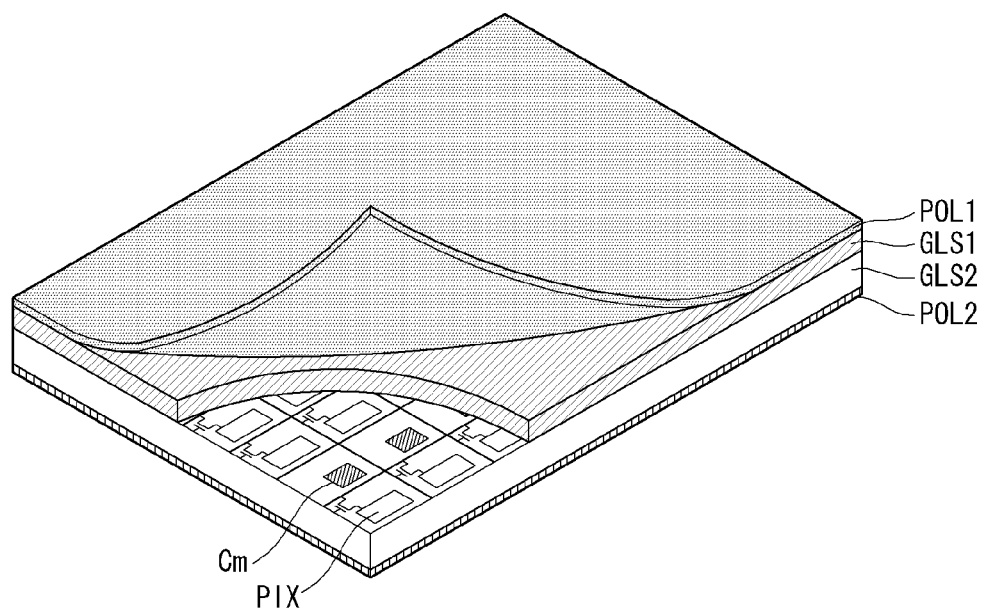

As shown in FIG. 3, the touch screen TSP may be attached on the upper polarizing plate POL1 of the display panel DIS. Alternatively, as shown in FIG. 4, the touch screen TSP may be formed between the upper polarizing plate POL1 and the upper glass substrate GLS1. In another example, as shown in FIG. 5, touch sensors Cm of the touch screen TSP may be formed on the lower glass substrate GLS2 along with pixel array of the display panel DIS in in-cell manner. In FIG. 5, 'PIX' denotes the pixel electrode of the liquid crystal cell.

Figure 2:
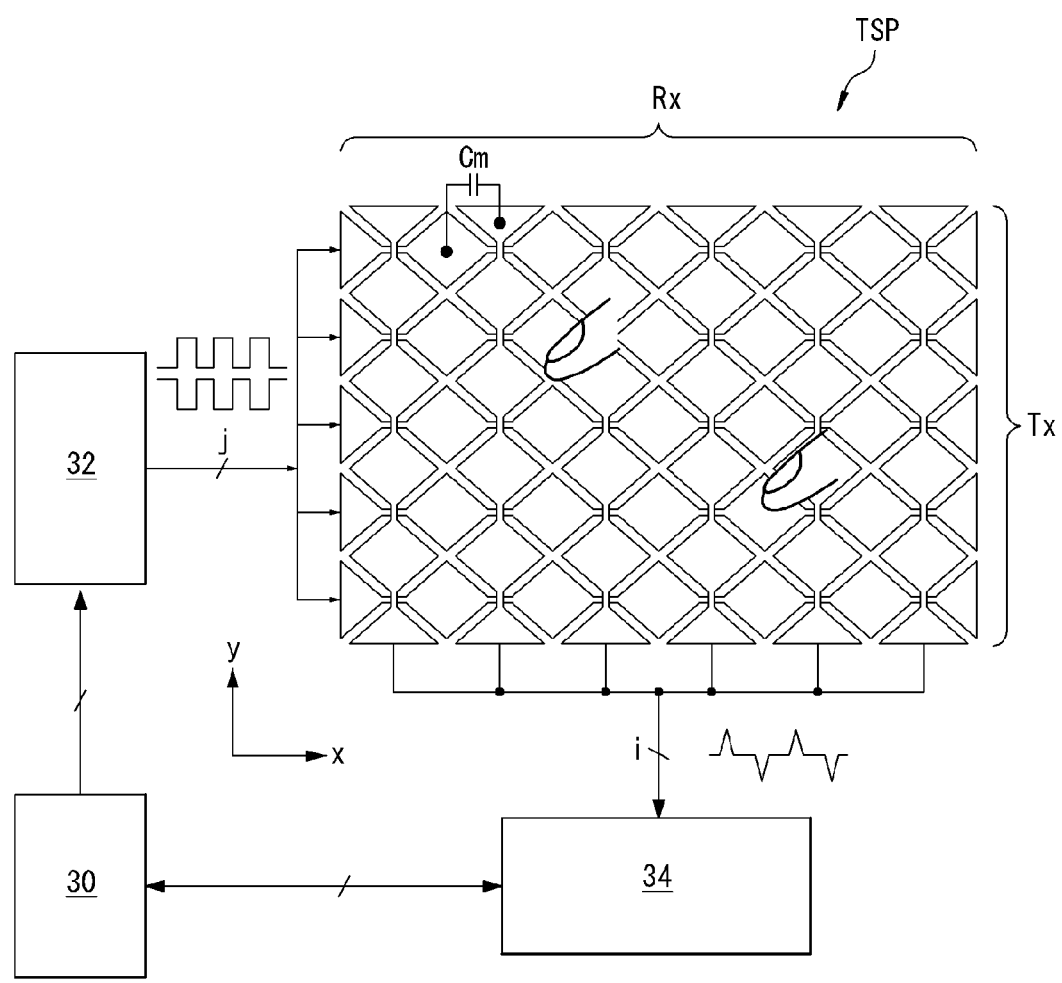
FIG. 2 illustrates a touch screen driver shown in FIG. 1.

The touch screen TSP includes Tx lines T1 to Tj, where j is a positive integer less than n, Rx lines R1 to Ri crossing the Tx lines T1 to Tj, where i is a positive integer less than m, and i×j touch sensors Cm formed between the Tx lines T1 to Tj and the Rx lines R1 to Ri. Each of the touch sensors Cm is implemented as a capacitor having a mutual capacitance as shown in FIG. 2.

The touch screen driving circuit includes a Tx driving circuit 32, an Rx driving circuit 34, a touch controller 30, etc. The touch screen driving circuit supplies driving signals shown in FIGS. 6 to 8 to the Tx lines T1 to Tj and samples charges of the touch sensors Cm received through the Rx lines R1 to Ri. The driving signals are one of pulse signal, sinusoidal waveform, and triangular waveform. The touch screen driving circuit coverts the sampled charges of the touch sensors Cm into digital data using an analog-to-digital converter (ADC) and generates final touch raw data. The Tx driving circuit 32 and the Rx driving circuit 34 may be integrated in one read-out IC (ROIC).

The Tx driving circuit 32 selects the Tx lines, to which will out-of-phase driving signals will be supplied, in response to a Tx setup signal SUTx received from the touch controller 30. The Tx driving circuit 32 simultaneously supplies out-of-phase driving signals A and B shown in FIG. 6 to the adjacent Tx lines.

The j touch sensors Cm are connected to one Tx line, and the adjacent touch sensors Cm may be sequentially sensed. In this instance, the driving signals may be successively supplied to the one Tx line j times. Then, the driving signals may be successively supplied to a next Tx line j times in the same manner.

In another sensing method, the j touch sensors Cm are connected to one Tx line, and the adjacent touch sensors Cm may be simultaneously sensed based on a sensing unit. In this instance, the driving signals may be successively supplied to the one Tx line (j/SUN+1) times. In the embodiment of the invention, SUN (sensing unit number) is the number of touch sensors Cm whose charges are simultaneously received through N Rx-lines, where N is a natural number equal to or greater than 2 and less than 'i'. Further, SUN is set based on an Rx setup signal SURx generated from the touch controller 30. The Rx driving circuit 34 simultaneously sets N Rx-channels in response to the Rx setup signal SURx and receives the charges of the touch sensors Cm through the N Rx-lines connected to the N Rx-channels. In '(j/SUN+1)', '1' indicates that when a remainder of 'j/SUN' is not zero, the driving signals A and B are supplied to the Tx line once again, so as to receive the charges of the touch sensors Cm through the remaining Rx-channels.

The driving signals may be repeatedly supplied to each of the Tx lines T1 to Tj more than twice, so as to increase a charge amount of an integration capacitor Cc (refer to FIG. 9B) by repeatedly accumulating the charges of the touch sensors Cm on the integration capacitor Cc of the Rx driving circuit 34 more than twice.

The Rx driving circuit 34 selects the Rx lines in response to the Rx setup signal SURx received from the touch controller 30 and receives the charges of the touch sensors Cm through the selected Rx lines. Each of the Rx lines receiving the charges of the touch sensors Cm is electrically coupled with the Tx line to which the driving signals A and B are supplied. The Rx driving circuit 34 stores the charges of the touch sensors Cm received at each driving signal in a sampling capacitor Cs in response to an Rx sampling clock SRx received from the touch controller 30. Then, the Rx driving circuit 34 samples the stored charges of the touch sensors Cm and accumulates the sampled charges of the touch sensors Cm on the integration capacitor Cc. The Rx driving circuit 34 converts the charges of the touch sensors Cm accumulated on the integration capacitor Cc into the digital data through the ADC and transmits the digital data to the touch controller 30.

The touch controller 30 is connected to the Tx driving circuit 32 and the Rx driving circuit 34 through an interface such as $I^2C$ bus, a serial peripheral interface (SPI), and a system bus. The touch controller 30 respectively supplies the Tx and Rx setup signals SUTx and SURx to the Tx driving circuit 32 and the Rx driving circuit 34. Hence, the touch controller 30 sets a Tx channel to output the driving signal and sets the Rx channel to receive the charges of the touch sensors Cm. The touch controller 30 supplies the Rx sampling clock SRx for controlling switches of a sampling circuit embedded in the Rx driving circuit 34 to the Rx driving circuit 34, thereby controlling sampling timing of the charges of the touch sensors Cm and operation timing of the ADC.

The touch controller 30 analyzes touch raw data received from the Rx driving circuit 34 using a known touch recognition algorithm. Hence, the touch controller 30 estimates coordinates values of touch raw data, in which the amount of change between before and after a touch input on the touch screen TSP is equal to or greater than a predetermined reference value, and outputs touch coordinate data HIDxy including the estimated coordinate values. The touch raw data, in which the amount of change between before and after the touch input is equal to or greater than the predetermined reference value, is estimated as a touch input (or proximity input). The touch coordinate data HIDxy output from the touch controller 30 is transmitted to the external host system. The touch controller 30 may be implemented as a microcontroller unit (MCU).

The host system may be connected to an external video source equipment, such as a navigation system, a set-top box, a DVD player, a Blu-ray player, a personal computer, a home theater system, a broadcasting receiver, and a phone system, and may receive image data from the external video source equipment. The host system includes a system-on-chip (SoC) including a scaler embedded therein and converts the image data received from the external video source equipment into a data format suitable to display on the display panel DIS. Further, the host system runs an application related to the coordinate values of the touch raw data received from the touch controller 30.

Figure 6:
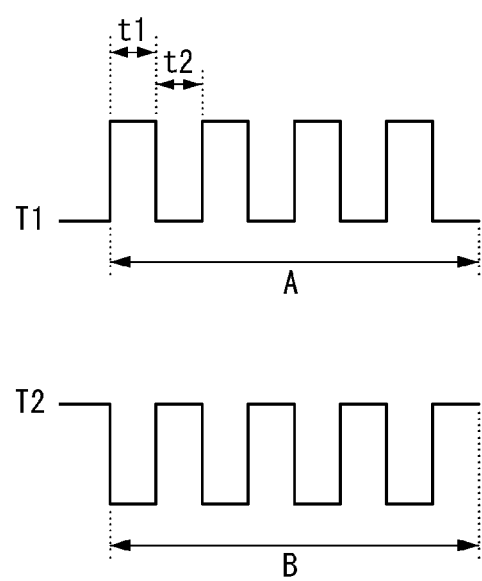
FIG. 6 is a waveform diagram of out-of-phase driving signals of a touch screen according to an example embodiment of the invention.
Figure 7:
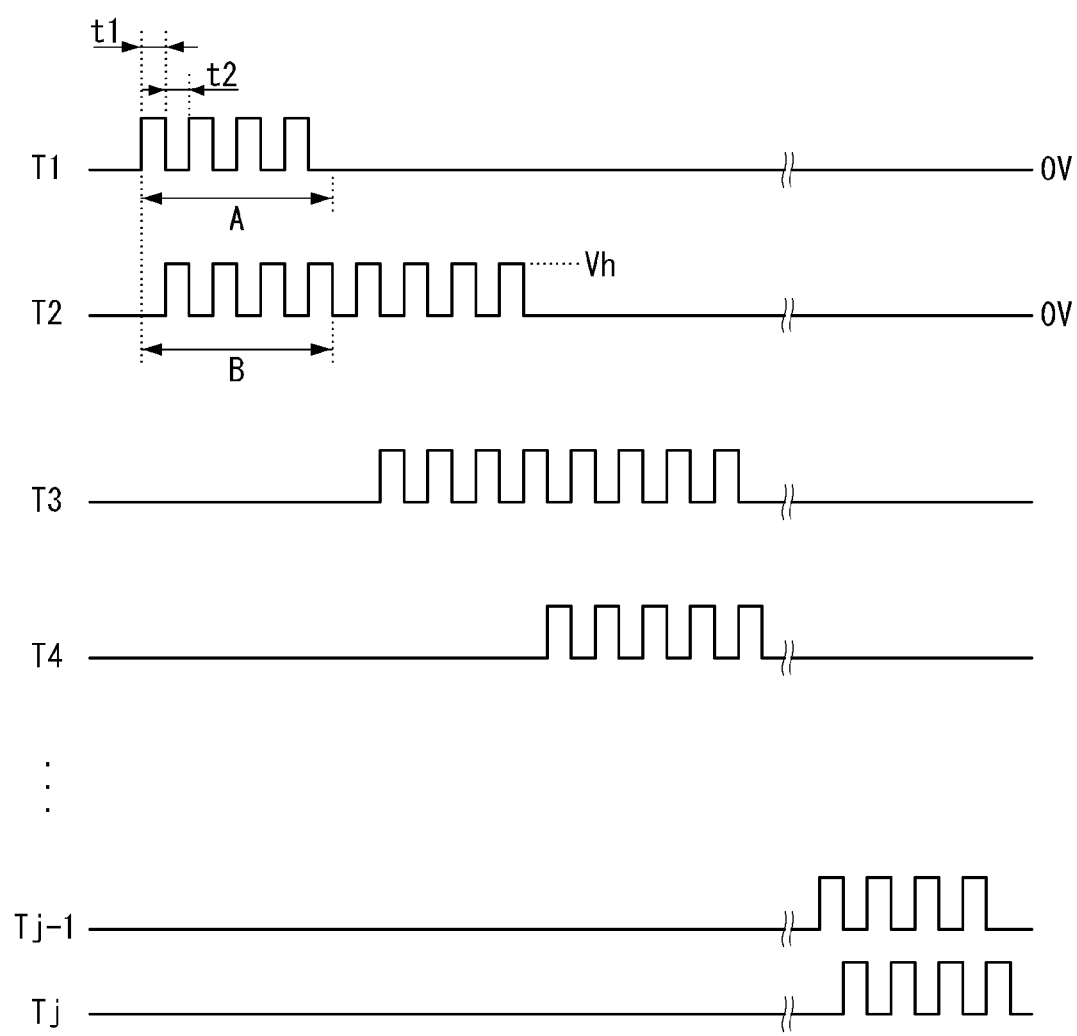
FIG. 7 is a waveform diagram illustrating an example of out-of-phase driving signals.
Figure 8:
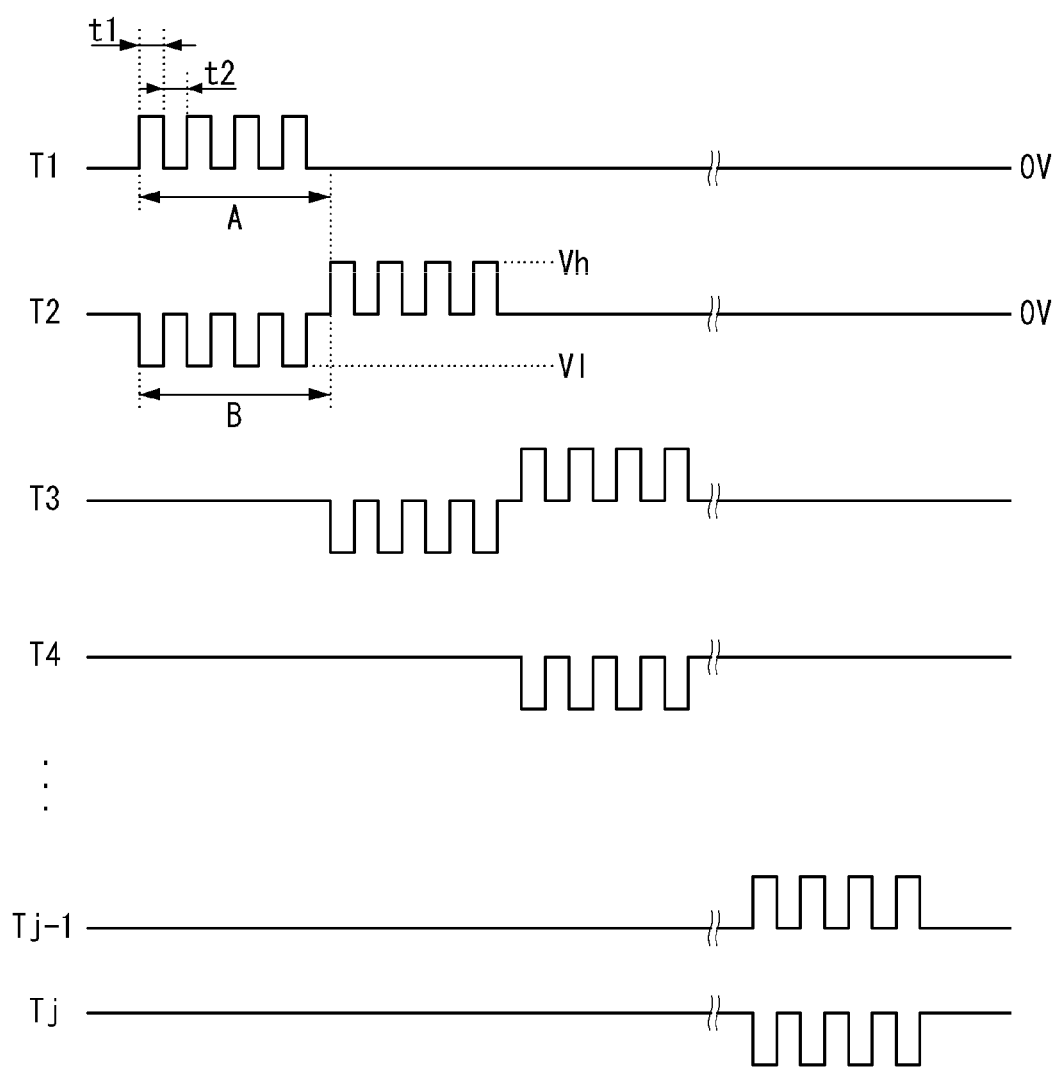
FIG. 8 is a waveform diagram illustrating another example of out-of-phase driving signals.

FIG. 7 is a waveform diagram illustrating an example of the out-of-phase driving signals shown in FIG. 6. FIG. 8 is a waveform diagram illustrating another example of the out-of-phase driving signals shown in FIG. 6.

As shown in FIG. 7, the Tx driving circuit 32 supplies the driving signal A to the first Tx line T1 and at the same time supplies the driving signal B, which has a phase difference of 180° with respect to the driving signal A, to the second Tx line T2 under the control of the touch controller 30. The Tx driving circuit 32 generates the driving signal B by shifting a phase of the driving signal A as much as 180°. Thus, every time the touch screen TSP is scanned, the out-of-phase driving signals A and B are simultaneously supplied to the adjacent first and second Tx lines T1 and T2.

As shown in FIG. 7, the driving signals A and B may be generated as a pulse swinging between a ground level voltage (i.e., zero volt) and a positive voltage Vh. Although not shown, the driving signals A and B may be generated as a pulse swinging between a negative voltage less than the ground level voltage and a positive voltage greater than the ground level voltage.

The Rx driving circuit 34 is synchronized with at least one of the out-of-phase driving signals A and B supplied to the first and second Tx lines T1 and T2 and receives the charges of the touch sensors Cm through the Rx lines. The Rx driving circuit 34 simultaneously receives the charges of the touch sensors Cm connected to the two adjacent Tx lines through the Rx line crossing the two adjacent Tx lines. As can be seen from FIGS. 9A, 9B, 13, 15, 17, and an Equation (1), the charges Q of the touch sensors Cm received by the Rx driving circuit 34 is generated as a relative ratio of the voltages distributed to the two touch sensors Cm.

Subsequently, the Tx driving circuit 32 supplies the driving signal A to the second Tx line T2 and at the same time supplies the driving signal B, which has a phase difference of 180° with respect to the driving signal A, to the third Tx line T3 under the control of the touch controller 30. Immediately after the driving signal B is supplied to the second Tx line T2, the driving signal A is supplied to the second Tx line T2. Thus, the out-of-phase driving signals A and B are simultaneously supplied to the second and third Tx lines T2 and T3. The Rx driving circuit 34 is synchronized with at least one of the out-of-phase driving signals A and B supplied to the second and third Tx lines T2 and T3 and sets the Rx channel to receive the charges of the touch sensors Cm. The Rx driving circuit 34 simultaneously receives the charges Q of the touch sensors Cm connected to the adjacent Tx lines of the touch screen TSP through the Rx line connected to the set Rx channel. Then, the Rx driving circuit 34 samples the received charge of the touch sensors Cm by charging the charge of the touch sensors Cm to the sampling capacitor Cs and converts the sampled charge into the digital data.

Immediately after the driving signal B is supplied to one of the second to (j−1)th Tx lines T2 to Tj−1, the driving signal A is supplied to the one of the second to (j−1)th Tx lines T2 to Tj−1. Only the driving signal B is supplied to the jth Tx line Tj. The Tx driving circuit 32 supplies the driving signal A to the (j−1)th Tx line Tj−1 and at the same time supplies the driving signal B, which has a phase difference of 180° with respect to the driving signal A, to the jth Tx line Tj under the control of the touch controller 30. Thus, the out-of-phase driving signals A and B are simultaneously supplied to the (j−1)th and jth Tx lines Tj−1 and Tj. The Rx driving circuit 34 is synchronized with at least one of the out-of-phase driving signals A and B supplied to the (j−1)th and jth Tx lines Tj−1 and Tj and sets the Rx channel to receive the charges of the touch sensors Cm. The Rx driving circuit 34 simultaneously receives the charges Q of the touch sensors Cm connected to the adjacent Tx lines of the touch screen TSP through the Rx line connected to the set Rx channel. Then, the Rx driving circuit 34 samples the charges of the touch sensors Cm by charging charge to the sampling capacitor Cs and converts the sampled charges into the digital data.

As shown in FIG. 8, the Tx driving circuit 32 supplies the driving signal A to the first Tx line T1 and at the same time supplies the driving signal B, which has a phase difference of 180° with respect to the driving signal A, to the second Tx line T2 under the control of the touch controller 30. Thus, the out-of-phase driving signals A and B are simultaneously supplied to the adjacent first and second Tx lines T1 and T2. The Rx driving circuit 34 simultaneously receives the charges Q of the touch sensors Cm connected to the first and second Tx lines T1 and T2 and samples the received charges of the touch sensors Cm by charging charge to the sampling capacitor Cs. Then, the Rx driving circuit 34 converts the sampled charges into the digital data.

The driving signal A may be generated as a pulse swinging between the ground level voltage and the positive voltage Vh, and the driving signal B may be generated as a pulse swinging between the ground level voltage and a negative voltage Vl. Because a difference between the positive voltage Vh and the negative voltage Vl shown in FIG. 8 is greater than a voltage difference between the driving signals A and B shown in FIG. 7, the positive voltage Vh of FIG. 8 may be sufficiently reduced.

Subsequently, the Tx driving circuit 32 supplies the driving signal A to the second Tx line T2 and at the same time supplies the driving signal B, which has a phase difference of 180° with respect to the driving signal A, to the third Tx line T3 under the control of the touch controller 30. Immediately after the driving signal B is supplied to the second Tx line T2, the driving signal A is supplied to the second Tx line T2. Thus, the out-of-phase driving signals A and B are simultaneously supplied to the second and third Tx lines T2 and T3. The Rx driving circuit 34 simultaneously receives the charge Q of the touch sensors Cm connected to the second and third Tx lines T2 and T3 and samples the charges of the touch sensors Cm by charging charge to the sampling capacitor Cs. Then, the Rx driving circuit 34 converts the sampled charges into the digital data.

Immediately after the driving signal B is supplied to one of the second to (j−1)th Tx lines T2 to Tj−1, the driving signal A is supplied to the one of the second to (j−1)th Tx lines T2 to Tj−1. Only the driving signal B is supplied to the jth Tx line Tj. The Tx driving circuit 32 supplies the driving signal A to the (j−1)th Tx line Tj−1 and at the same time supplies the driving signal B, which has a phase difference of 180° with respect to the driving signal A, to the jth Tx line Tj under the control of the touch controller 30. Thus, the out-of-phase driving signals A and B are simultaneously supplied to the (j−1)th and jth Tx lines Tj−1 and Tj. The Rx driving circuit 34 simultaneously receives the charges Q of the touch sensors Cm connected to the (j−1)th and jth Tx lines Tj−1 and Tj and samples the charges of the touch sensors Cm by charging charge to the sampling capacitor Cs. Then, the Rx driving circuit 34 converts the sampled charge into the digital data.

FIGS. 9A to 11 illustrate in detail the sampling circuit of the Rx driving circuit 34 and an operation of the sampling circuit.

As shown in FIGS. 9A to 11, the sampling circuit of the Rx driving circuit 34 includes first to fourth switches S11, S12, S21, and S22, a sampling capacitor CS, an integration capacitor Cc, an operational amplifier (op-amp) OP, etc. The sampling capacitor CS is connected between a first node n1 and a second node n2. The integration capacitor Cc is connected between a third node n3 and an output terminal of the op-amp OP. The third node n3 is connected to an inverting input terminal of the op-amp OP. A non-inverting input terminal of the op-amp OP is connected to a ground level voltage source GND, and the output terminal of the op-amp OP is connected to an input terminal of the ADC.

An input terminal of the first switch S11 is connected to the touch sensors, which are adjacent to each other in a vertical direction, through the Rx (or R(p)) line, where p is a natural number equal to or less than 'i'. In FIGS. 9A to 11, C1 and C2 are capacitances of the touch sensors which are adjacent to each other in the vertical direction. An output terminal of the first switch S11 is connected to the first node n1.

The first switch S11 is turned on in response to a first Rx sampling clock S1($t1$) for a time t1. The first Rx sampling clock S1($t1$) is synchronized with a high logic voltage of the driving signal A supplied to the qth Tx line T(q), where q is a natural number equal to or less than 'j−1'. The second switch S12 is connected between the second node n2 and the ground level voltage source GND. The second switch S12 is turned on in response to the first Rx sampling clock S1($t1$) for the time t1.

Figure 10:
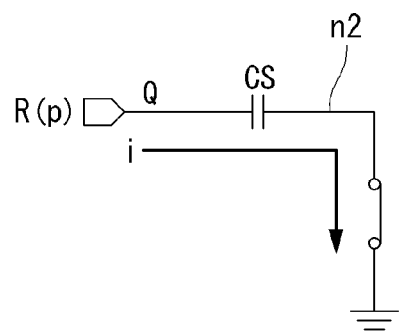
Figure 11:
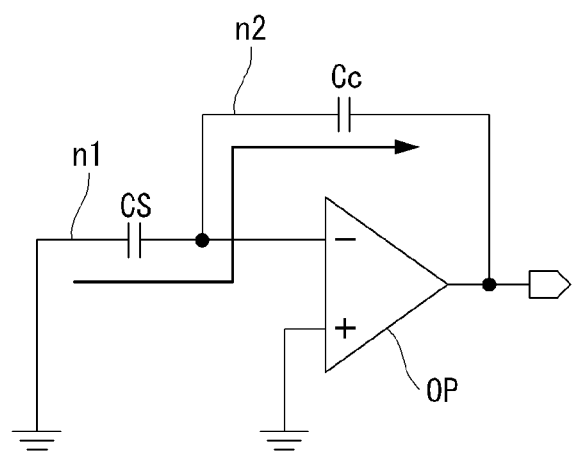

The first and second switches S11 and S12 are synchronized with the high logic voltage of the driving signal A shown in FIGS. 6 to 9B and thus are turned on for each time t1. As shown in FIG. 10, the sampling capacitor Cs is charged to charges Q received from the touch sensor and samples the charge of the touch sensor. On the other hand, the first and second switches S11 and S12 are synchronized with a low logic voltage of the driving signal A shown in FIGS. 6 to 9B and thus are turned off for each time t2. Hence, as shown in FIG. 11, the first and second switches S11 and S12 open a current path between an input terminal of the Rx driving circuit 34 and the first node n1 and a current path between the second node n2 and the ground level voltage source GND.

The third switch S21 is connected between the first node n1 and the ground level voltage source GND. The third switch S21 is turned on in response to a second Rx sampling clock S2($t2$) for each time t2. The second Rx sampling clock S2($t2$) is synchronized with the low logic voltage of the driving signal A supplied to the qth Tx line T(q). The fourth switch S22 is connected between the second node n2 and the third node n3. The fourth switch S22 is turned on in response to the second Rx sampling clock S2($t2$).

The third and fourth switches S21 and S22 are turned off for the time t1. Hence, as shown in FIG. 10, the third and fourth switches S21 and S22 open a current path between the first node n1 and the ground level voltage source GND and a current path between the second node n2 and the third node n3. On the other hand, the third and fourth switches S21 and S22 are turned on for each time t2. Hence, as shown in FIG. 11, the third and fourth switches S21 and S22 connect the sampling capacitor CS to the integration capacitor Cc and accumulate the charge sampled by the sampling capacitor CS on the integration capacitor Cc. The ADC converts the charge of the integration capacitor Cc into the digital data.

Figure 9A:
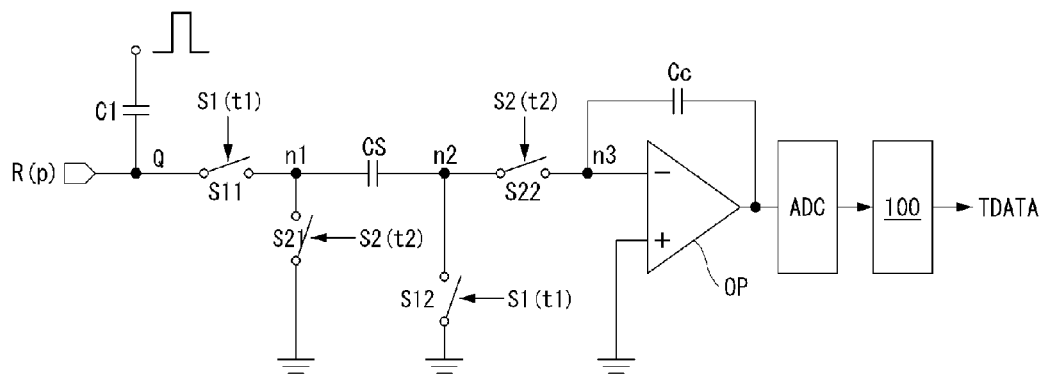
FIG. 9A is a circuit diagram illustrating driving signals and a sampling circuit of a related art.

In a related art, as shown in FIG. 9A, the charges Q of the touch sensor received through the Rx line R(p) were obtained by multiplying the capacitance C1 of the first touch sensor connected to the qth Tx line T(q) by a voltage Vin of a driving signal. Namely, the charges Q were C1*Vin. When a noise α is added to the voltage of the touch sensor, the charges Q received from the touch sensor are C1*(Vin+α). Thus, in the related art, when the noise is added to the voltage of the touch sensor, the noise adversely affects the sensing sensitivity.

Figure 9B:
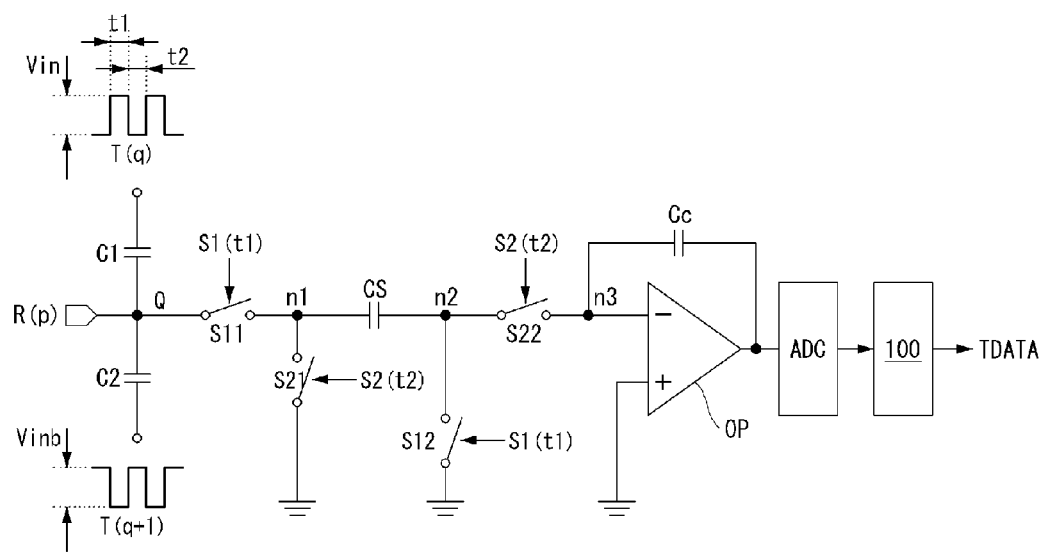
FIG. 9B illustrates out-of-phase driving signals and a sampling circuit according to an example embodiment of the invention.

On the other hand, in the embodiment of the invention, because the charges Q of the touch sensors received through the Rx line Ri are distributed to the vertically adjacent touch sensors as shown in FIG. 9B, the charges Q are received as a relative ratio of the voltages of the touch sensors. Hence, the charges Q of the touch sensor may be represented by the following Equation (1) when there is no noise α.

$$Q = \frac{C1}{C1+C2} \times |Vin - Vinb| \quad \text{Equation (1)}$$

In the above Equation (1), 'Vin' is a voltage of the driving signal A applied to the Tx line T(q) connected to the first touch sensor, and Vinb is a voltage of the driving signal B applied to the Tx line T(q+1) connected to the second touch sensor. As shown in FIG. 7, when the voltage Vinb of the driving signal B is zero, the above Equation (1) is as follows:

$$Q = \frac{C1}{C1+C2} \times Vin.$$

In the embodiment of the invention, when the noises respectively applied to the voltage of the first and second touch sensors are α and β in the above Equation (1), Q may be represented by the following Equation when the one touch sensor among the vertically adjacent touch sensors is touched:

$$Q = \frac{C1}{C1+C2} \times |(Vin+\alpha) - (Vin+\beta)|.$$

Thus, when the noise is added to the voltages of the touch sensors because of an influence of driving signals of the display panel, an influence of the noise on the touch screen TSP according to the embodiment of the invention may be in proportion to about α−β. In general, the noises α and β each is voltage having almost the same phase and almost the same magnitude. Considering this, the influence of the noise resulting from the display panel on the touch screen TSP according to the embodiment of the invention is significantly reduced compared to the relater art.

When the out-of-phase driving signals are applied to the vertically adjacent touch sensors and a change amount of the voltage of the vertically adjacent touch sensors is sensed, the touch sensors on (j−1) lines may be sensed when the total number of lines of the touch screen TSP is j. A reduction in the number of lines, which may be sensed through the touch recognition, may be compensated through a compensation method of the touch raw data which will be discussed below in more detail by referring to FIGS. 12 to 23. If there is no difference in the touch sensitivity felt by the user, the compensation method of the touch raw data may be omitted. Further, if a touch screen with a high resolution is used, the compensation method of the touch raw data illustrated may be omitted. On the other hand, if the user feels a reduction in the touch sensitivity of the touch screen because one touch recognition line lacks in the touch screen, it may be preferable, but not required, that the compensation method of the touch raw data illustrated. The compensation method for the touch raw data obtained by applying the out-of-phase driving signals to the vertically adjacent touch sensors is described below.

In FIGS. 9A and 9B, a reference numeral 100 denotes a data compensator. The data compensator 100 performs the compensation method of the touch raw data shown in FIGS. 12 to 23.

The touch controller 30 analyzes final touch raw data TDATA received from the data compensator 100 using a touch recognition algorithm and estimates a touch (or proximity) input location. Then, the touch controller 30 outputs a coordinate value of the estimated touch (or proximity) input location.

Figure 12:
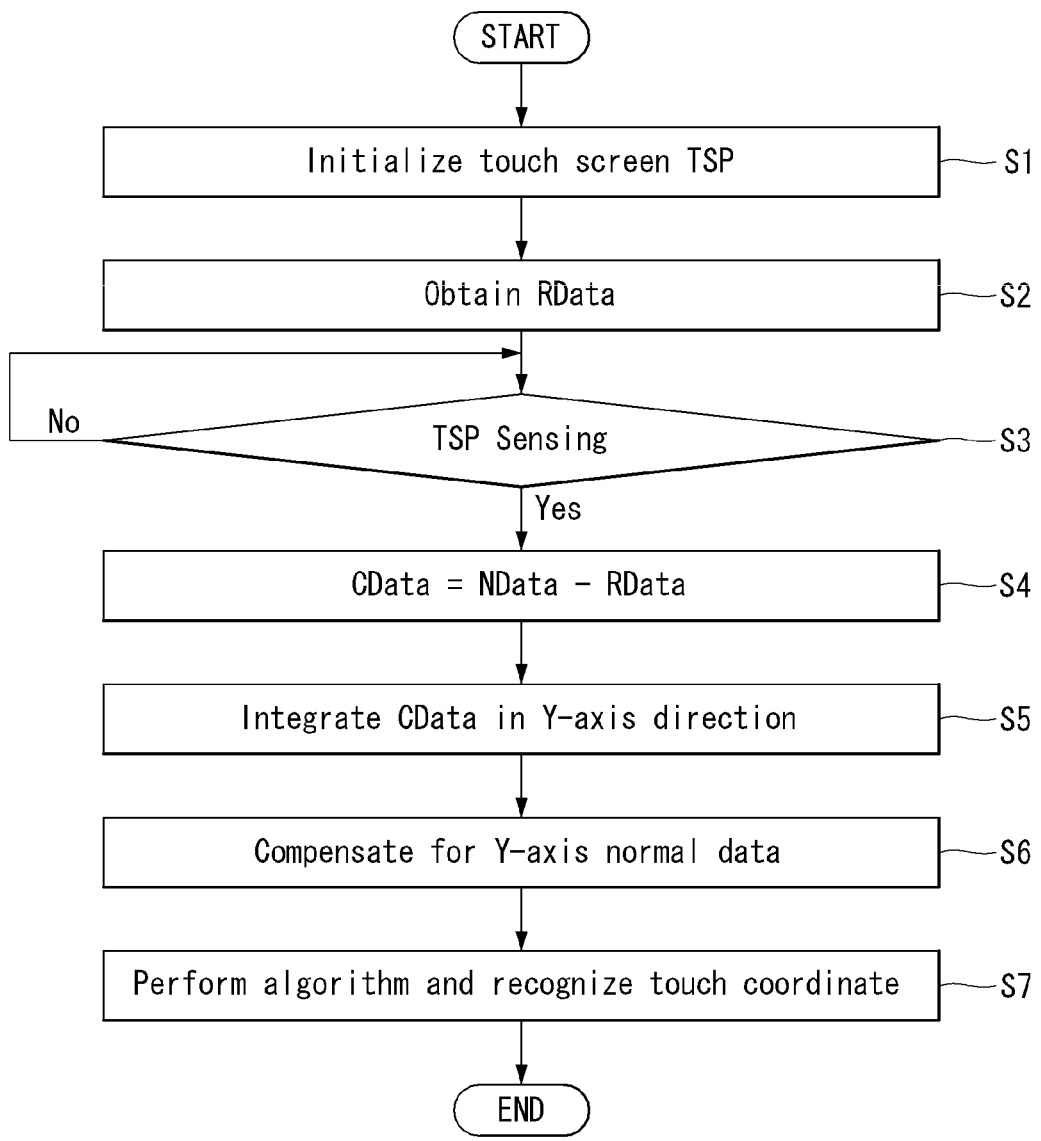
FIG. 12 is a flow chart illustrating a method for compensating for touch raw data according to an example embodiment of the invention.

FIG. 12 is a flow chart illustrating a method for compensating for touch raw data according to the embodiment of the invention.

As shown in FIG. 12, the compensation method of the touch raw data initializes the touch screen TSP and the touch screen driving circuit, sequentially applies the out-of-phase driving signals A and B to the Tx lines T1 to Tj of the touch screen TSP, and senses the charges of the touch sensors through the Rx lines R1 to Ri of the touch screen TSP. As a result of the initial scanning of the touch screen TSP, the Rx driving circuit 34 outputs initial digital data obtained when there is no the touch input (or the proximity input) from the i×(j−1) touch sensors of the touch screen TSP, as the touch raw data in steps S1 and S2. Hereinafter, data including the initial digital data (i.e., the touch raw data) obtained in steps S1 and S2 and dummy data to be later described is defined as reference data.

As shown in FIG. 19, a digital value of the initial digital data may be 2000. It is assumed that '2000' is a digital value of the charge received from the touch sensors in a normal case where there is no noise for the sake of brevity and ease of reading. Because the number of initial digital data obtained in the initial scanning process of the touch screen TSP is i×(j−1), the number of initial digital data is less than the number of touch sensors of the touch screen TSP by the reference data corresponding to one line. Hereinafter, it is assumed that 'i' is 43 and 'j' is 27. The compensation method of the touch raw data adds dummy data corresponding to one line to the initial digital data. The dummy data is not obtained from the touch screen TSP and is set to a value (i.e., zero) previously stored in an internal memory of the Rx driving circuit 34 or an internal memory of the ROIC. The dummy data is defined as reference data of an uppermost line (i.e., a first line) of the touch screen TSP. The 43×27 reference data RData including the dummy data shown in FIG. 19 are stored in a memory. The memory may be the internal memory of the Rx driving circuit 34 or the internal memory of the ROIC.

The compensation method of the touch raw data sequentially applies the out-of-phase driving signals A and B to the Tx lines T1 to Tj to scan the touch screen TSP. The compensation method of the touch raw data performs the TSP sensing in step S3 and when the touch input (or the proximity input) is detected as the scanning result of the touch screen TSP, calculates the obtained touch raw data (hereinafter, referred to as normal data NData) and the previously stored reference data RData as indicated by the following Equation (2), thereby calculating first compensation data CData in step S4.

$$CData = NData - RData \qquad \text{Equation (2)}$$

The normal data NData has a digital value greater or less than the reference data depending on a location on the touch screen TSP. This is described in detail with reference to FIGS. 13 to 18.

Figure 13:
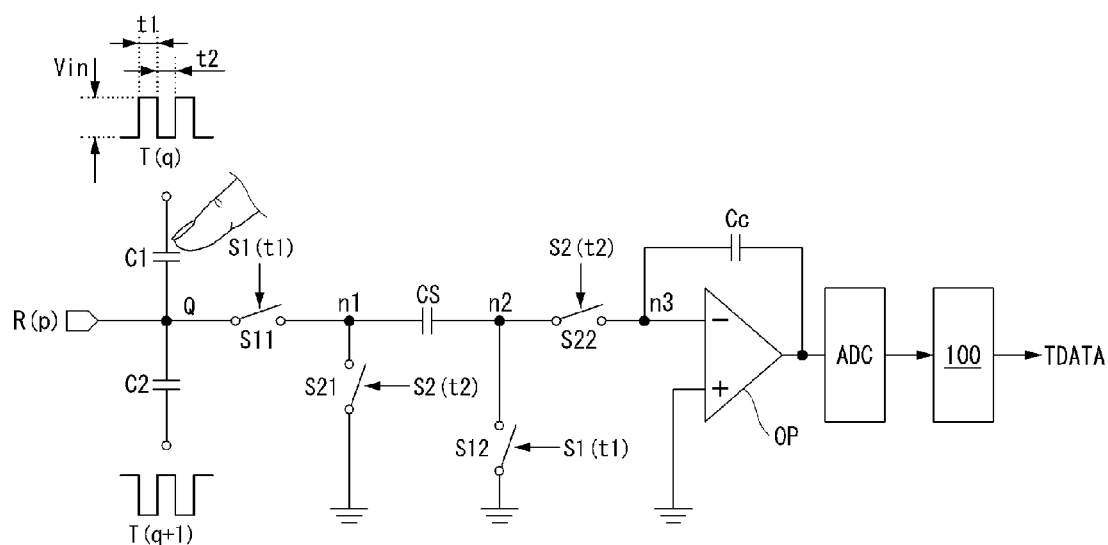
FIG. 13 illustrates a first case where an upper touch sensor among touch sensors connected to adjacent Tx lines is touched when out-of-phase driving signals are simultaneously applied to the adjacent Tx lines.
Figure 14:
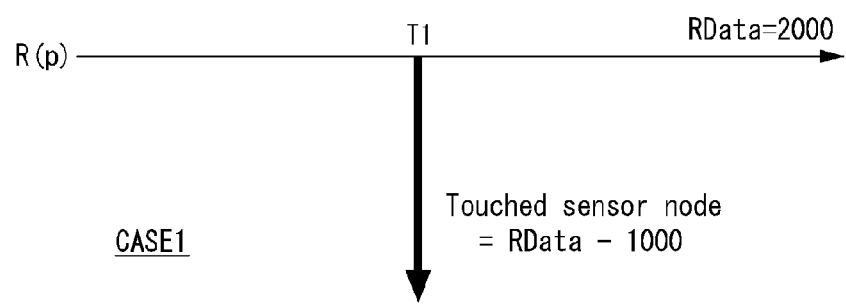
FIG. 14 illustrates a digital value of normal data obtained in the first case illustrated in FIG. 13.

FIG. 13 illustrates a first case CASE1 where the upper touch sensor among the touch sensors connected to the adjacent Tx lines is touched when the out-of-phase driving signals A and B are simultaneously applied to the adjacent Tx lines. FIG. 14 illustrates a digital value of the normal data obtained in the first case CASE1 illustrated in FIG. 13.

As shown in FIGS. 13 and 14, when the first touch sensor connected to the qth Tx line T(q) is touched with a user's finger or a conductive material, an amount of charges charged to the first touch sensor is reduced. In the first case CASE1, it is assumed that a change amount in the charges of the touch sensor before and after the touch operation is defined as a digital value of '1000'. As a result, if the amount of charges of the touch sensor in the above Equation (1) is reduced by '1000', the digital value of the normal data obtained from the touched touch sensor may be less than the digital value of the reference data RData as shown in FIG. 14.

The first case CASE1 is generated when the touch sensor connected to the first Tx line T1 is touched when the out-of-phase driving signals A and B are simultaneously applied to the first Tx line T1 and the second Tx line T2 (see 'IN1' of FIG. 20), and also is generated when the touch sensor connected to the 26th Tx line T26 is touched when the out-of-phase driving signals A and B are simultaneously applied to the 26th Tx line T26 and the 27th Tx line T27 (see 'IN3' of FIG. 20).

In FIG. 20, normal data NData of 'IN1' or 'IN3' is a digital value calculated through the change amount in the charges of the touch sensor received from the third Rx line R3 when the out-of-phase driving signals A and B are applied to the first and second Tx lines T1 and T2. The normal data NData of 'IN1' or 'IN3' is 1000 (=RData−1000).

Figure 15:
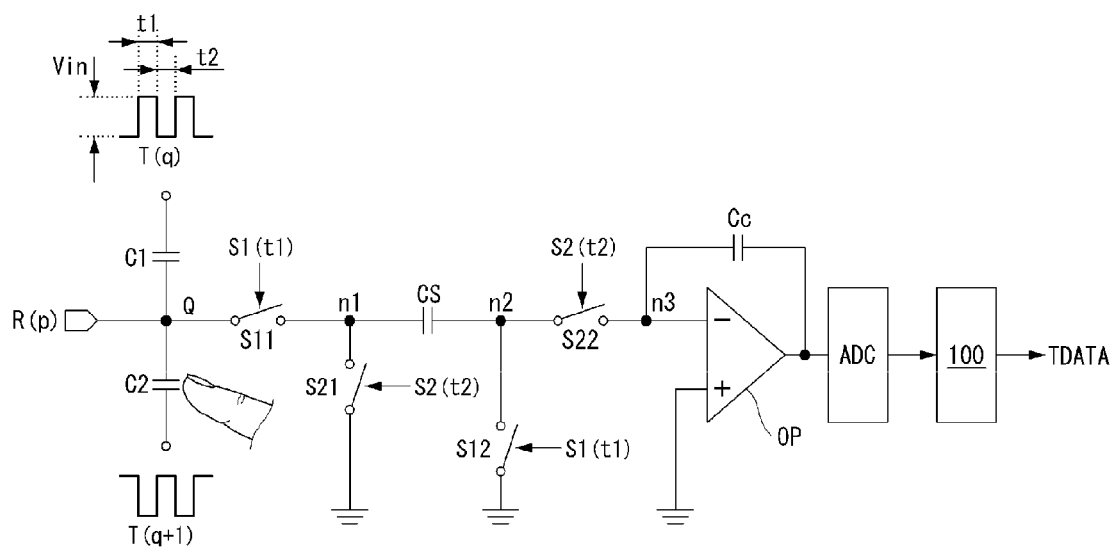
FIG. 15 illustrates a second case where a lower touch sensor among touch sensors connected to adjacent Tx lines is touched when out-of-phase driving signals are simultaneously applied to the adjacent Tx lines.
Figure 16:
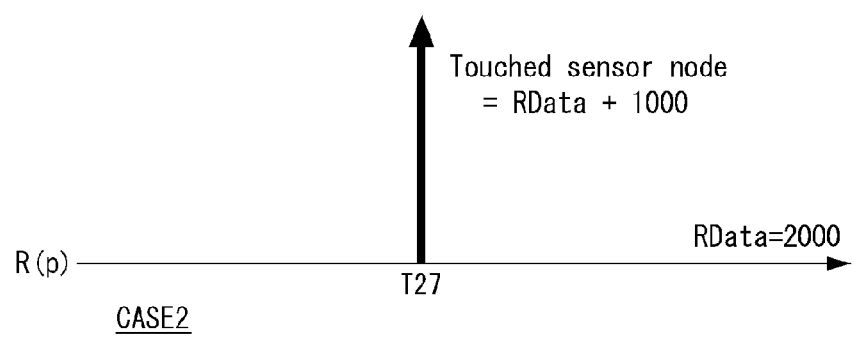
FIG. 16 illustrates a digital value of normal data obtained in the second case illustrated in FIG. 15.

FIG. 15 illustrates a second case CASE2 where the lower touch sensor among the touch sensors connected to the adjacent Tx lines is touched when the out-of-phase driving signals A and B are simultaneously applied to the adjacent Tx lines. FIG. 16 illustrates a digital value of the normal data obtained in the second case CASE2 illustrated in FIG. 15.

As shown in FIGS. 15 and 16, when the second touch sensor connected to the (q+1)th Tx line T(q+1) is touched with the user's finger or the conductive material, an amount of charges of the second touch sensor is reduced. In the second case CASE2, it is assumed that a change amount in the charges of the second touch sensor before and after the touch operation is defined as a digital value of '1000'. As a result, if the amount of charges of the touch sensor in the above Equation (1) is increased by '1000', the digital value of the normal data obtained from the touched touch sensor may be greater than the digital value of the reference data RData as shown in FIG. 16.

The second case CASE2 corresponds to 'IN2' of FIG. 20, and normal data NData of 'IN2' is 3000 (=RData+1000). When the out-of-phase driving signals A and B are simultaneously applied to the 26th Tx line T26 and the 27th Tx line T27, normal data generated from the touch sensors connected to the 27th Tx line T27 is obtained only in the second case CASE2. This is because the 27th Tx line T27 is the last Tx line.

Figure 17:
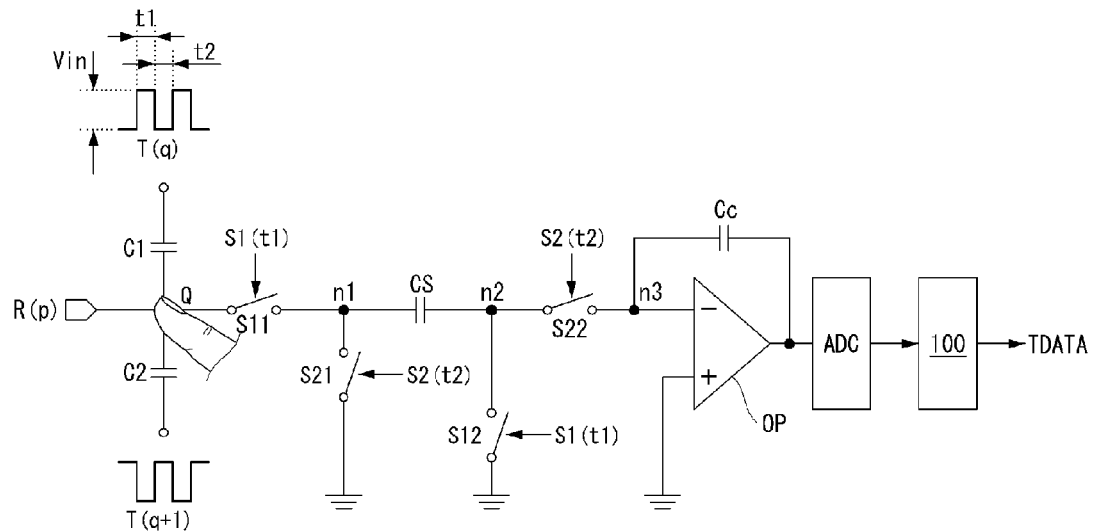
FIG. 17 illustrates a third case where upper and lower touch sensors connected to adjacent Tx lines are simultaneously touched when out-of-phase driving signals are simultaneously applied to the adjacent Tx lines.
Figure 18:
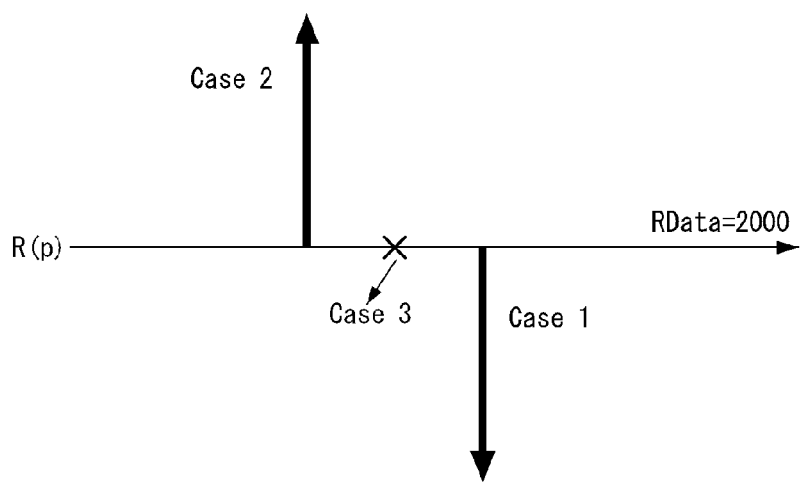
FIG. 18 illustrates a digital value of normal data obtained in the third case illustrated in FIG. 17.

FIG. 17 illustrates a third case CASE3 where the upper and lower touch sensor connected to the adjacent Tx lines are simultaneously touched when the out-of-phase driving signals A and B are simultaneously applied to the adjacent Tx lines. FIG. 18 illustrates a digital value of the normal data obtained in the third case CASE3 illustrated in FIG. 17.

The third case CASE3 is generated when the first touch sensor connected to the qth Tx line T(q) and the second touch sensor connected to the (q+1)th Tx line T(q+1) are simultaneously touched with the user's finger or the conductive material as shown in FIGS. 17 and 18. The third case CASE3 generates normal data having a middle digital value between the digital value of the normal data generated in the second case CASE2 where the touch sensors connected to the qth Tx line T(q) are touched when the out-of-phase driving signals A and B are simultaneously applied to the (q−1)th Tx line T(q−1) and the qth Tx line T(q) and the digital value of the normal data generated in the first case CASE1 where the touch sensors connected to the (q+1)th Tx line T(q+1) are touched when the out-of-phase driving signals A and B are simultaneously applied to the (q+1)th Tx line T(q+1) and the (q+2)th Tx line T(q+2). The middle digital value has a value similar to the reference data RDATA.

The compensation method of the touch raw data according to the embodiment of the invention integrates the first compensation data CData obtained through steps S1 to S4 illustrated in FIG. 12 along a Y-axis direction (or Rx-line direction) to produce final touch raw data in step S5. A data integration method adds the first compensation data between the data adjacently arranged along the Y-axis direction of the touch screen TSP to a previously calculated integration result. When an integration result of nth data is $I_n$, an integration result of (n−1)th data is $I_{n-1}$, and first compensation data of the nth data is $N_n$, the integration result $I_n$ of the nth data in the data integration method is calculated as $I_n = I_{n-1} + N_n$. For example, the data integration method calculates integration results $I_1, I_2, I_3, \ldots, I_{25}, I_{26}$, and $I_{27}$ as follows (refer to FIGS. 21 and 22).

$$I_1 = 0$$

$$I_2 = I_1 + N_2 = 0 + (-1000) = -1000$$

$$I_3 = I_2 + N_3 = (-1000) + 0 = -1000$$

$$I_{25} = I_{24} + N_{25} = (-1000) + 1000 = 0$$

$$I_{26} = I_{25} + N_{26} = 0 + 0 = 0$$

$$I_{27} = I_{25} + N_{27} = 0 + (-1000) = -1000$$

The compensation method of the touch raw data according to the embodiment of the invention adds a compensation value to the integration results obtained in step S5 to compensate for Y-axis normal data of the touch screen TSP in step S6. In the embodiment of the invention, the Y-axis normal data is normal data of the touch sensors connected to the Rx line formed along the Y-axis direction of the touch screen TSP. The compensation value is automatically set so that when the compensation value is added to each of the integration results arranged along each Rx line, a minimum value of the integration results arranged along each Rx line is changed to zero, and thus is independently determined in each Rx line. The compensation value, which is added to the integration results arranged along each Rx line (i.e., the Y-axis direction), may be set to the same value, compensation values, which are added to the integration results arranged in the X-axis direction, may be set to different value from each other. For example, a first compensation value to be added to the integration results arranged along the first Rx line R1 may be the same as or different from a second compensation value to be added to the integration results arranged along the second Rx line R2 depending on the minimum integration result of each of the first and second Rx lines R1 and R2. If the minimum integration results of the first and second Rx lines R1 and R2 are different from each other, the first compensation value and the second compensation value may be different from each other.

For example, as shown in FIG. 22, a minimum value of the integration results arranged along the third Rx line R3 is '−1000'. In this instance, a compensation value to be added to the integration results of the third Rx line R3 is automatically set to 1000, so that a sum of the minimum integration result '−1000' of the third Rx line R3 and the compensation value is zero. Hence, the compensation value '1000' is added to all of the integration results arranged along the third Rx line R3. As a result, as shown in FIG. 23, the number of the final touch raw data TDATA produced by the compensation method of the touch raw data according to the embodiment of the invention is the same as the number of touch sensors formed on all of the lines of the touch screen TSP.

The touch recognition algorithm analyzes the final touch raw data TDATA obtained in step S6 to estimate a coordinate value of the touch (or proximity) input location in step S7.

As described above, the embodiment of the invention simultaneously applies the out-of-phase driving signals to the adjacent Tx lines, thereby reducing the influence of the noise from the display panel on the touch screen. Furthermore, the embodiment of the invention simultaneously applies the out-of-phase driving signals to the adjacent Tx lines, thereby solving the problem of data omission generated in the sensing of the touch sensors through the data compensation. Hence, a loss of a resolution of the touch screen may be prevented.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch screen driver, comprising:
a touch screen including:
transmission (Tx) lines,
reception (Rx) lines crossing the Tx lines, and
touch sensors between the Tx lines and the Rx lines;
a Tx driving circuit configured to sequentially supply a pair of out-of-phase driving signals including a first driving signal and a second driving signal, which has a phase difference of 180° with respect to the first driving signal, to the Tx lines, the first driving signal and the second driving signal being simultaneously respectively supplied to only a first and a second Tx line adjacent to each other, the first driving signal and the second driving signal subsequently being simultaneously respectively supplied to only the second and a third Tx line, the third Tx line being different from the first Tx line, the first driving signal and the second driving signal having a same frequency; and
an Rx driving circuit configured to:
sample a charge of the touch sensor received through the Rx lines coupled with the Tx lines;
convert the sampled charge into digital data;
output initial digital data obtained as an initial scanning result of the touch screen; and
output digital data obtained as a scanning result of the touch screen as normal data when a touch input of the touch screen is generated.

2. The touch screen driver of claim 1, wherein the Tx driving circuit is configured to generate the second driving signal by shifting a phase of the first driving signal as much as 180°.

3. The touch screen driver of claim 1, further comprising:
a data compensator configured to generate final touch raw data based on the normal data and reference data including the initial digital data and dummy data having a predetermined digital value; and
a touch controller configured to:
control operation timings of the Tx driving circuit and the Rx driving circuit;
analyze the final touch raw data using a previously set touch recognition algorithm; and
estimate a coordinate value of a touch input location.

4. The touch screen driver of claim 3, wherein the data compensator is configured to:
produce compensation data with values obtained by subtracting the reference data from the normal data; and
add a value of the compensation data to an integration result of the compensation data to generate the final touch raw data.

5. The touch screen driver of claim 4, wherein the data compensator is configured to:
calculate a difference between vertically adjacent first and second compensation data in the compensation data, which is vertically arranged along a Y-axis direction of the touch screen, as a first integration result;
subtract the first integration result from third compensation data to calculate a second integration result; and
accumulate a difference between the adjacent compensation data.

6. The touch screen driver of claim 5, wherein the predetermined digital value of each dummy data is set to zero.

7. The touch screen driver of claim 6, wherein:
the compensation value is independently determined in each Rx line;
the same $i^{th}$ compensation value is added to integration results arranged along an $i^{th}$ Rx line, where "i" is a natural number; and
when the $i^{th}$ compensation value is added to each of the integration results arranged along the $i^{th}$ Rx line, a minimum value of the integration results arranged along the $i^{th}$ Rx line is changed to zero.

8. The touch screen driver of claim 1, wherein, after the first driving signal and the second driving signal are supplied to only the second and the third Tx line, the first driving signal and the second driving signal are subsequently supplied to only the third and a fourth Tx line, the fourth Tx line being different from the first and second Tx lines.

9. A method for driving a touch screen driver including a touch screen including transmission (Tx) lines, reception (Rx) lines crossing the Tx lines, and touch sensors formed between the Tx lines and the Rx lines, the method comprising:
sequentially supplying a pair of out-of-phase driving signals including a first driving signal and a second driving signal, which has a phase difference of 180° with respect to the first driving signal, to the Tx lines, the first driving signal and the second driving signal being simultaneously respectively supplied to only a first and a second Tx line adjacent to each other, the first driving signal and the second driving signal subsequently being simultaneously respectively supplied to only the second and a third Tx line, the third Tx line being different from the first Tx line, the first driving signal and the second driving signal having a same frequency;
sampling a charge of the touch sensor received through the Rx lines coupled with the Tx lines; and
converting the sampled charge into digital data,
wherein the converting of the sampled charge into the digital data includes:
generating initial digital data obtained as an initial scanning result of the touch screen; and
generating digital data obtained as a scanning result of the touch screen as normal data when a touch input of the touch screen is generated.

10. The method of claim 9, further comprising:
generating final touch raw data based on the normal data and reference data including the initial digital data and dummy data having a predetermined digital value;
analyzing the final touch raw data using a previously set touch recognition algorithm; and
estimating a coordinate value of a touch input location.

11. The method of claim 10, wherein the generating of the final touch raw data includes:
generating compensation data with values obtained by subtracting the reference data from the normal data; and
adding the value of the compensation data to an integration result of the compensation data to generate the final touch raw data.

12. The method of claim 11, wherein the adding of the compensation value to the integration result of the compensation data to generate the final touch raw data includes:
calculating a difference between vertically adjacent first and second compensation data in the compensation data, which is vertically arranged along a Y-axis direction of the touch screen, as a first integration result;
subtracting the first integration result from third compensation data to calculate a second integration result; and
accumulating a difference between the adjacent compensation data.

13. The method of claim 12, wherein the predetermined digital value of each dummy data is set to zero.

14. The method of claim 13, wherein:
the compensation value is independently determined in each Rx line;
the same $i^{th}$ compensation value is added to integration results arranged along an $i^{th}$ Rx line, where "i" is a natural number; and
when the $i^{th}$ compensation value is added to each of the integration results arranged along the $i^{th}$ Rx line, a minimum value of the integration results arranged along the $i^{th}$ Rx line is changed to zero.

15. The method of claim 9, further comprising, after the first driving signal and the second driving signal are supplied to only the second and the third Tx line, the first driving signal and the second driving signal are subsequently supplied to only the third and a fourth Tx line, the fourth Tx line being different from the first and second Tx lines.

* * * * *